United States Patent Office 3,432,089
Patented Mar. 11, 1969

3,432,089
SCREW ROTOR MACHINE FOR AN ELASTIC WORKING MEDIUM
Lauritz Benedictus Schibbye, Saltsjo-Duvnas, Sweden, assignor to Svenska Rotor Maskiner Aktiebolag, Nacka, Sweden, a corporation of Sweden
Filed Oct. 11, 1966, Ser. No. 585,860
Claims priority, application Great Britain, Oct. 12, 1965, 43,204/65
U.S. Cl. 230—138
Int. Cl. F04c 29/08, 29/10; F04b 49/00
11 Claims

ABSTRACT OF THE DISCLOSURE

A compressor of the screw rotor type having means for injecting pressurized cooling liquid into its working space and a slidable valve element for adjustment of its capacity, said valve element being hollow and provided with injection nozzles and connected to a servo motor of the piston and cylinder type operated by said pressurized liquid and having a tubular piston rod used for conducting pressurized liquids into the interior of the valve element.

---

The present invention relates to a screw rotor machine for an elastic working medium and of the type which comprises a housing containing a working space in the form of two intersecting bores and having a low pressure port at one end and a high pressure port at the other end, two intermeshing screw rotors being rotatably mounted in said bores and part of the wall of said working space consisting of an axially slidable valve member the position of which determines the capacity of the machine. A machine of this type acting as a compressor is shown for instance in U.S. Patent 3,314,597. Other types of screw rotor machines in which the present invention is applicable are shown for instance in British Patents 959,831, 958,364, 958,365 and 959,833.

A problem in screw rotor machines of these types is to carry out the adjustment of the valve member or members. In the U.S. Patent 3,314,597 it has been suggested to locate a nut of ball bushing type in the valve member and a screw cooperating therewith which screw is axially fixed and angularly adjustable. This embodiment has certainly shown to function satisfactorily but it is complicated and expensive and furthermore the screw must pass through several walls between different spaces in the machine which gives rise to certain sealing problems. In addition certain difficulties can arise at the adjustment of the valve member when the pressure difference between the high pressure side and the low pressure side of the machine is great as for instance in refrigerating compressors where the pressure difference can rise above 15 kg./cm.²

According to the invention the valve member is operably connected to a servo motor operated by a pressure fluid already present in the machine for another purpose, valve means being provided for controlling said servo motor. In compressors acting with cooling liquid injection it is especially suitable to use the liquid as pressure fluid but in other types of machines the lubricating oil for the rotors, the working medium itself or cooling fluid for the casing and/or the rotors can, depending upon the circumstances, be used.

Figure 1:
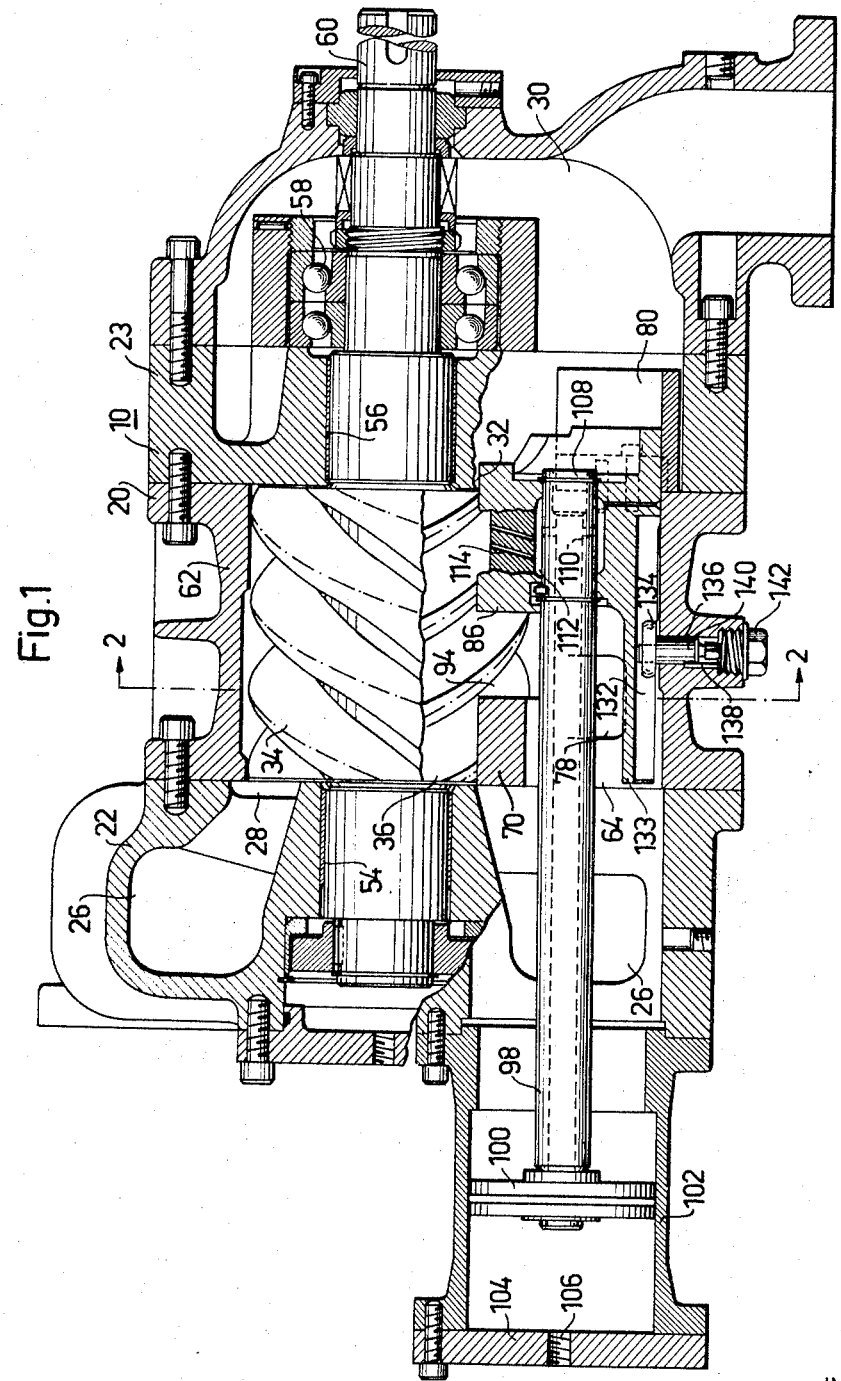
Figure 2:
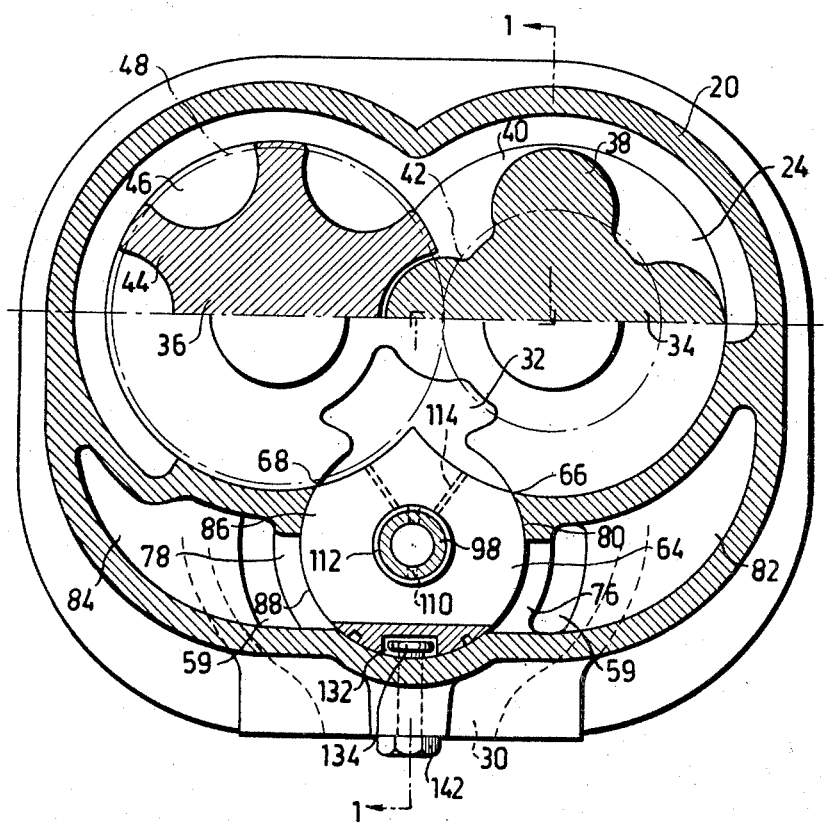
Figure 3:
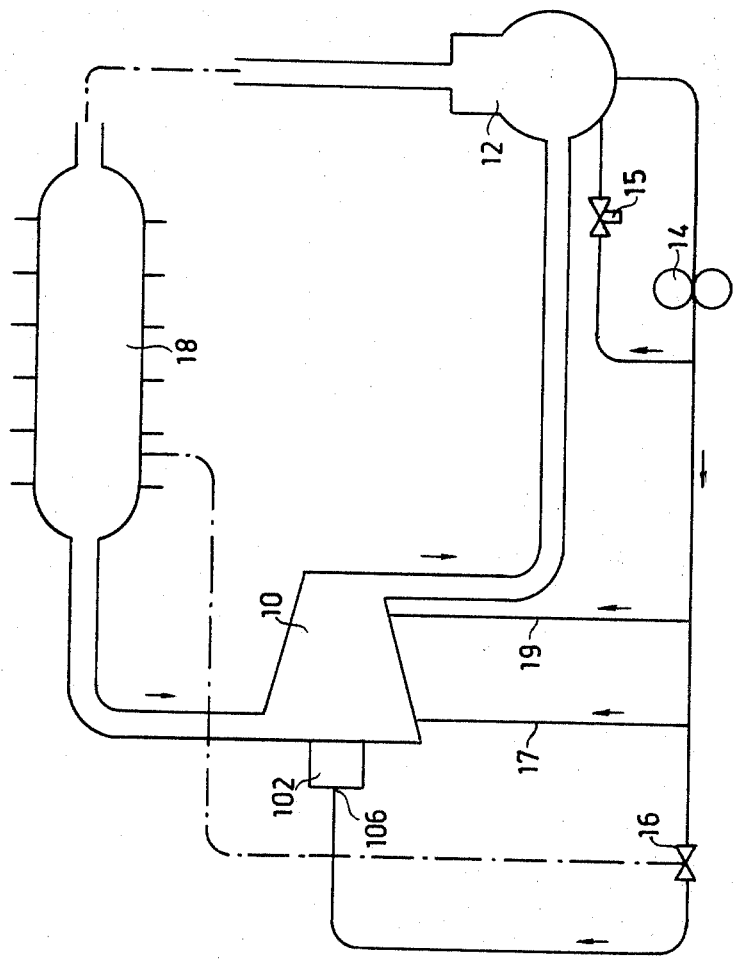
Figure 4:
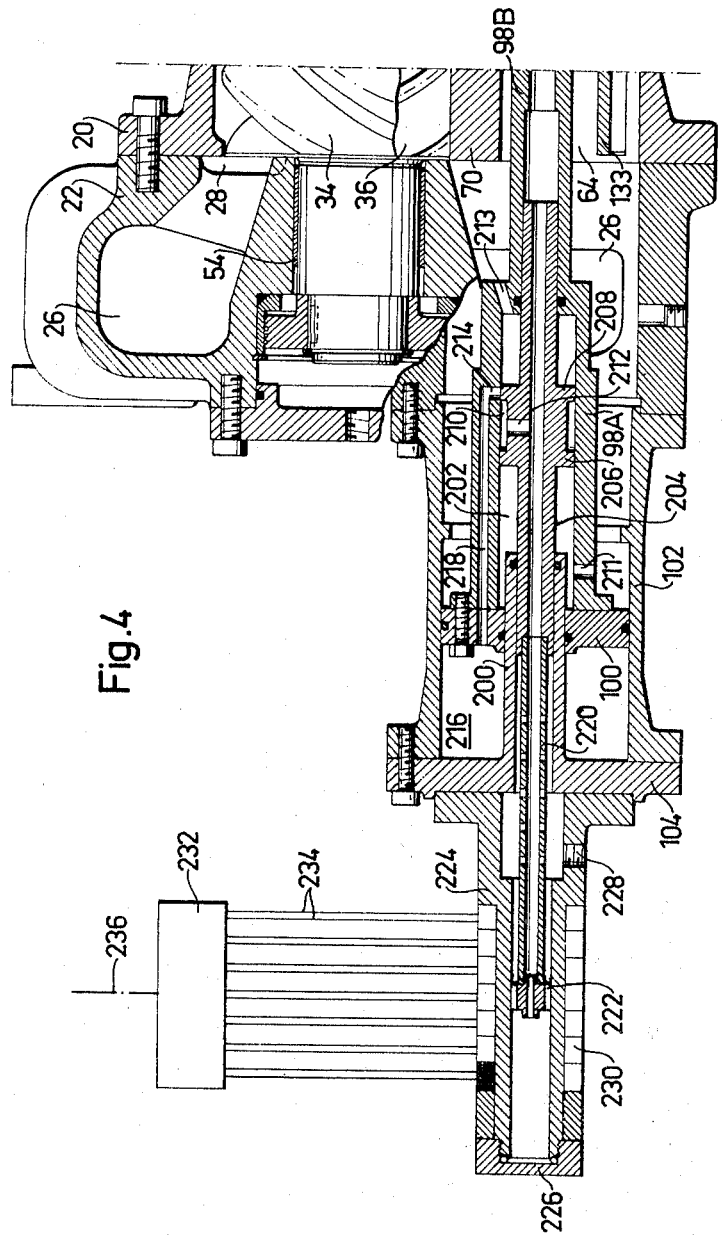
Figure 5:
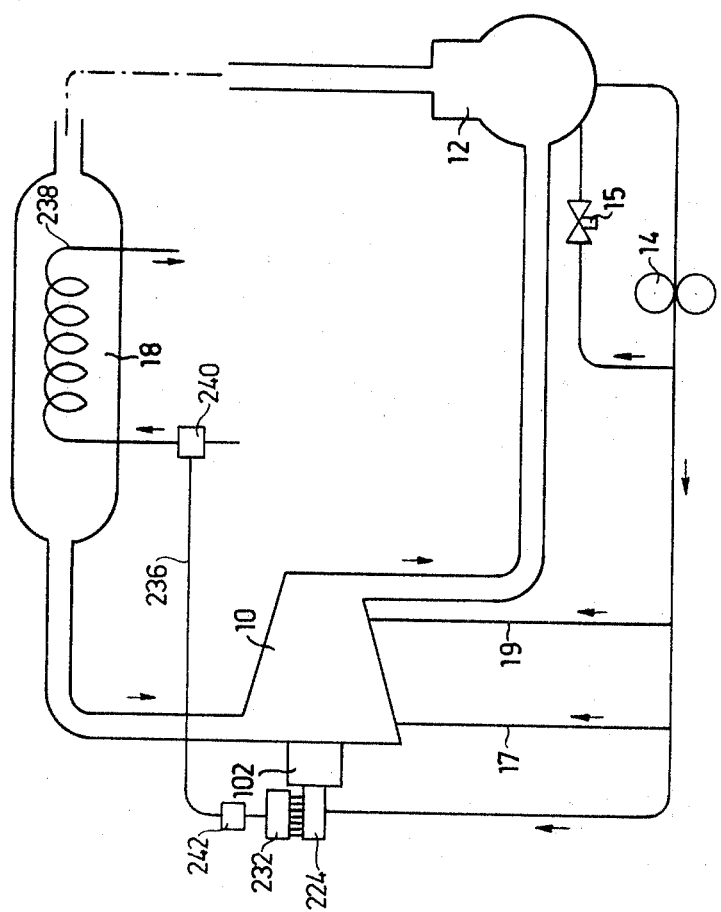

In order to simplify the understanding of the invention this specification will, however, in the continuing part thereof without limitation of the scope be limited to a compressor generally shaped in the way which is shown in U.S. Patent 3,314,597 in which pressure liquid is injected into the working space of the compressor through channels in the valve member. Compressors of this type are shown in the attached drawings in which:

FIG. 1 shows a longitudinal section of one embodiment of a compressor according to the invention the section being taken along line 1—1 in FIG. 2, FIG. 2 shows a transverse section taken along line 2—2 in FIG. 1, FIG. 3 shows a fragmentary diagram of a refrigerating system comprising the compressor according to FIGS. 1 and 2, FIG. 4 shows a fragmentary longitudinal section of another embodiment, and FIG. 5 is a diagram of a refrigerating system comprising a compressor according to FIG. 4.

The screw compressor 10 comprises a casing 20 provided with a low pressure end plate 22 and a high pressure end plate 23 in which casing a working space 24 is provided substantially in the form of two intersecting cylindrical bores of the same size having parallel axes located in the same horizontal plane. In the low pressure end plate 22 a low pressure channel 26 is provided which communicates with the working space 24 through a low pressure port 28 located in the contact plane between the low pressure end plate and the casing 20. Furthermore a high pressure channel 30 is provided in the high pressure end plate 23 which high pressure channel communicates with the working space through an axial high pressure port 32.

Two cooperating rotors, one male rotor 34 and one female rotor 36, are provided in the working space 24 with their axes coaxial with the axes of the bores. The male rotor 34 is provided with four helical lands 38 with intervening grooves 40 which have a wrap angle of about 300°. The lands have flanks the major portions of which are convex and located outside the pitch circle 42 of the male rotor. The female rotor 36 is provided with six helical lands 44 with intervening grooves 46 which have a wrap angle of about 200°. The grooves 46 have a cross-section substantially in the form of a segment of a circle and are provided with flanks the major portions of which are concave and located inside the pitch circle 48 of the female rotor.

The rotors 34, 36 are mounted in the low pressure end plate 22 by radial journal bearings 54 and in the high pressure end plate 23 radially by journal bearings 56 and axially by twin ball thrust bearings with shoulders 58. The male rotor 34 is further provided with a stub shaft 60 extending outside the high pressure end plate 23 for connection to a driving motor not shown.

The main part of the low pressure port 28 lies on one side of the plane of the axes of the bores and the axial high pressure port 32 is completely located on the other side of said plane.

The barrel wall 62 of the working space 24 is provided with a recess 64 communicating with the axial high pressure port 32 which recess extends axially from the high pressure end plate 23 towards the low pressure end plate 22. The recess 64 and the barrel wall of the working space 24 intersect along the straight edges 66, 68 parallel with the axes of the bores and symmetrically located relatively to the intersection line between the bores. The circular barrel wall 80 of the recess 64 extends out into the high pressure channel 30.

A separable portion 70 of the casing which portion is in sealing contact with the recess and has a cross-section corresponding to that of the working space 24 is located in the recess 64 at the low pressure end plate 22 and fixed to the main body of the casing 20.

The recess 64 communicates with the low pressure channel 26 through an axial channel in the casing portion 70 and through ports 76, 78 in the barrel wall 80 of the recess 64 and channels 82, 84 in the casing.

An axially slidable valve member 86 is further located in the recess 64 and is provided with a cylindrical wall 88 sealingly cooperating with the barrel wall 80 of the recess 64 and with a cross-section corresponding to that of the bores of the working space 24 on the portion of the valve extending outside the recess 64.

The space between the casing portion 70 and the valve 86 forms in this way a bleed port 94 communicating with a low pressure channel 26 while the portion of the recess 64 located between the high pressure end plate 23 of the working space and the end of the valve 86 facing that plate forms a radial high pressure port communicating with the high pressure channel 30.

The valve 86 is rigidly connected with a piston 100 by a tubular rod 98 which passes through the piston. The piston has a cross-section area of about the same order of magnitude as the cross-section area of the valve member 86. The piston 100 is axially adjustable and sealingly mounted in a cylinder 102 rigidly connected to the low pressure end plate 22 and coaxial with the axis of the recess 64. One end of the cylinder 102 communicates directly with the low pressure channel 26 while the other end of the cylinder is closed by a cover 104 in which a channel 106 is provided for admittance of pressure liquid. The end of the tubular rod 98 located in the valve 86 is provided with a plug 108 and furthermore the rod is provided with radial bores 110 for admittance of liquid to a chamber 112 located in the valve 86 from which chamber the liquid is injected into the working space 24 through channels 114.

A guiding groove 132 is provided in the valve 86 which guiding groove extends out into a portion 133 of the valve 86 extending towards the low pressure channel 26 at the end of which it communicates with the low pressure channel 26. This guiding groove 132 cooperates with a guiding body 134 fixed in the casing 20 which guiding body is eccentrically mounted on a dowel 140 which is angularly adjustable in a hole 136 in the casing 20 and anchorable by a pin 138. Before anchoring of the dowel 140 by the pin 138 the dowel is angularly adjusted so that the valve 86 by the eccentrically mounted guiding body 134 is angularly adjusted to a position where the edge of the valve 86 is on the same line as the corresponding edge of the casing portion 70 so that it is guaranteed that the rotors 34, 36 during their rotation will not come into contact with the valve 86. When this position has been adjusted a hole is made partly in the casing 20 partly in the dowel 140 in which hole the pin 138 is inserted. The hole 136 is then closed by a screw 142.

In FIG. 3 a refrigerating system in which the compressor 10 is included is shown schematically and fragmentarily. The working medium is conveyed from the compressor 10 to an oil separator 12 from which oil by means of a pump separately driven and provided with a maximum pressure valve 15 is conveyed through an adjustable throttling valve 16 to the inlet channel 106 to the cylinder 102. In addition oil is admitted to the bearings 54 and 56 and 58 through conduits 17 and 19, respectively. The throttling valve 16 is provided to be actuated in dependence of the pressure or the temperature in an evaporator 18.

The compressor 10 in the system acts in the following way. At start of the compressor the pump 14 is started and the throttling valve 16 is opened in the first place so that oil of high pressure is introduced into the cylinder 102. The piston 100 is then pressed in direction towards the compressor so that the valve 86 is moved to the position in which the bleed port 94 has its maximum size. In this way the compression work and also the necessary starting torque of the driving motor for the compressor is decreased to a minimum. During this period oil is injected into the working space 24 through the channels 114 so that the flanks of the rotors are lubricated. The driving motor is then started and runs up to its normal working speed. When the motor has reached this speed the throttling valve 16 is actuated so that the pressure in the cylinder 102 decreases and the piston 100 is moved in direction from the compressor until the valve 86 has completely closed the bleed port 94. The compressor 10 acts then in a way known per se. If the temperature and thus the pressure in the evaporator 18 should decrease below a certain predetermined value the throttling valve 16 is automatically actuated so that the pressure in the cylinder 102 increases and the valve 86 opens the bleed port 94 to a suitable size after which the throttling valve 16 is actuated so that the axial forces on the valve 86 are equalized and the valve is adjusted in a suitable position. If then the temperature and pressure in the evaporator 18 increases above a certain predetermined value the throttling valve 16 is further throttled so that the valve 86 in a corresponding way decreases the area of the bleed port 94 and possibly closes the port completely.

A compressor of the type shown in FIGS. 1 and 2 can also be used for instance in an air pressure system with fundamentally the same adjusting system as shown in FIG. 3. The only difference is that the throttling valve 16 instead of being adjusted in dependence on the pressure or temperature in the evaporator 18 from which working medium is admitted to the compressor 10 is adjusted in dependence on the pressure in an air receiver to which the air is admitted after passage of the compressor 10.

As can be seen from the diagram in FIG. 3 the pressure in the oil separator 12 is practically the same as the discharge pressure from the compressor 10 so that it is necessary for the pump 14 to give only a relatively small increase of the pressure of the oil in order to get a pressure thereof sufficient to move the piston 100 and the valve 86. The pumping work is for this reason not greater than that which is required for injection of the desired mass of oil into the working space 24 of the compressor.

In FIG. 4 there is shown the left-hand end of a compressor similar to that shown in FIG. 1 but provided with a modified servo motor device for the adjustment of the axially slidable valve member 86 (not shown in FIG. 4).

According to FIG. 4 the cover or end wall 104 of the servo motor cylinder 102 is provided with a tubular axial projection 200 extending centrally into the cylinder. In this case the servo motor piston 100 is provided with a central opening which slidingly and sealingly engages the outside of the tube 200. The piston rod is of a stepped type and comprises a wider portion 98A and a narrower portion 98B. The wider portion 98A forms a cylindrical chamber 202 which contains a tubular slide valve element 204 provided between its ends with two lands 206 and 208 defining an annular space 210 communicating with the interior of the valve element through an opening 212. The spaces axially outside the lands 206 and 208 communicate with the low pressure channel 26 through openings 211 and 213, respectively.

In the wall of the cylindrical chamber 202 there is a port 214 communicating with the working chamber 216 of the servo motor through a passage 218.

The ends of the valve element 204 are slidingly and sealingly received in the end wall tube 200 and the narrower piston rod portion 98B, respectively. To the left-hand end of the valve element is secured a perforated tube 220 of non-magnetic material which extends outside the end wall 104 and at its free end carries a head 222 of magnetic material received in a tube 224 of non-magnetic material secured to the outside of the end wall 104 and closed at its outer end by a cap 226. The tube 224 is provided with an opening 228 for the connection of a pressure fluid pipe.

The head 222 is preferably generally cylindrical and provided with a plurality of axial grooves at its periphery and a central passage. These grooves and passage enable the head to move freely in the tube as the fluid pressure is always the same on both sides of the head 222. However, this object may be attained by several other means, for instance by means of grooves or passages in the wall of the tube 224.

The tube 224 carries a set of solenoids 230 separately connected to a control device 232 through conduits 234, This control device may be of any suitable type capable of selectively energizing the solenoids 230 in dependence on signals supplied through the conduit 236.

In the position shown in FIG. 4 the land 208 of the valve element 204 covers the port 214. Pressure fluid such as cooling and lubricating oil supplied through the opening 228 enters the interior of the perforated tube 220 and passes through the tubular valve element 204 and the narrower tubular piston rod portion 98B to the oil injection channels 114 (see FIG. 1).

The pressure of the liquid supplied through the opening 228 prevails along its entire path of flow and also in the tube 224. Therefore, the valve element is not subjected to any axial forces due to pressure differences and will at least theoretically remain stationary even though the solenoid registering with the head or magnetic core 222 is not continuously energized.

If a signal supplied through the conduit 236 calls for a higher capacity of the compressor the control device energizes the solenoid located adjacent to and to the left of the solenoid registering with the magnet core 222. This results in that the magnet core moves to the left a distance corresponding to the width of a solenoid so that the port 214 is uncovered by the land 208 and put into communication with the low pressure end of the compressor. As described with reference to FIG. 1 the righthand end surface of the axially slidable valve member 86 is subjected to the pressure at the high pressure end of the compressor and this pressure now moves the servo motor piston 100 to the left while oil is discharged from the working chamber 216 through the passage 218 and the port 214 until the latter is again closed by the land 208 as the piston moves to the left. Then the piston stops in a new position corresponding to a smaller bleed port 94 (see FIG. 1) and a higher capacity of the compressor.

When a smaller capacity is required the movement of the magnet core will be the reversed.

FIG. 5 shows a refrigerating system substantially similar to that shown in FIG. 3 but including a compressor according to FIG. 4. Further, the evaporator 18 contains a tube coil 238 included in a circuit for a brine which circulates through a system of radiators in known manner. In the embodiment shown the brine system comprises a thermostat device 240 sensing the temperature of the brine immediately before it enters the coil 238 but it is evident that this thermostat device may be located at any point of the system. Numeral 242 indicates a time switch which intermittently connects the thermostatic device 240 to the control device. The time interval between such connections and the duration of the connection periods may be empirically determined as they depend on the reaction rate of the refrigerating system and the rapidity of the movement of the servo motor piston 100.

The thermostatic device 240 may be of a type which may be set on a desired temperature and which does not emit any signal as long as this temperature is maintained but emits signals at deviations of the temperature from the desired value to restore that value. The signal is transmitted temporarily to the control device 232 by the time switch 242 so that the control device 232 likewise temporarily energizes a properly located solenoid to move the magnet core 222 one step in the required direction. Next time the time switch closes the temperature may have been restored and no signal is emitted by the thermostatic device. However, it may also happen that the temperature is not restored in which case the magnet core 222 is moved a further step in the same direction. On the other hand, if between two closures of the time switch 242 the temperature has passed from one side to the other of the desired value the magnet core moves in the opposite direction at the second closure.

It is easy to realize that the movement of the magnet core 222 can be effected also by a single solenoid or a single permanent magnet which is moved along the tube 224 by some automatic means or manually. Also when using a plurality of solenoids as shown in FIG. 4 it is possible to provide solely manually operable switch means. Preferably the control device 232 is provided with manually operable means over-ruling the thermostatic control i.e. to render it possible to adjust the compressor on its lowest capacity at start for the reason set forth in connection with the embodiment according to FIGS. 1 to 3. However, such manually operable means may instead be made as a separate switch device.

From the above description it appears that the refrigerating system may be hermetically closed (provided that also the driving motor is encased) since there are no openings for movable control elements or the like which otherwise might cause leakage of working medium from the system to the atmosphere.

What I claim is:

1. In screw compressor apparatus of the character described and having a housing containing a working space in the form of two intersecting bores, a low-pressure port at one end and a high pressure port at the other end, two intermeshing screw rotors rotatably mounted in said bores, an axially slidable valve member forming part of the wall of said working space with the position thereof determining the capacity of said compressor, and an external source of pressurized cooling fluid, the combination which comprises a chamber in said valve member in flow communication with said source and having nozzle openings providing flow communication between said chamber and said working space for injecting cooling fluid into said space, pressure fluid operated piston and cylinder means in flow communication with said source and operated by said pressurized cooling fluid and having a tubular piston rod connected to said sliding valve member, and a passage disposed in said piston rod providing flow communication between said source and said chamber in said valve member.

2. Apparatus as described in claim 1 in which said passage also provides flow communication between said source and at least one working chamber of said piston and cylinder means.

3. Apparatus as recited in claim 2 which includes control valve means connected to said piston and cylinder means, and having a slide valve element cooperating with and axially movable relative to said tubular piston rod to control flow of pressurized fluid into and out of at least one working chamber of said piston and cylinder means in known manner so that each axial position of said slide valve element corresponds to a certain axial position of said piston rod and piston.

4. Apparatus as recited in claim 3 and which is included in a working medium system of the closed cycle type in which all movable members of said piston and cylinder means and said control valve means are disposed substantially entirely in spaces communicating with said system for preventing medium leakage from said system.

5. Apparatus as recited in claim 4 in which magnetic means are provided for actuating said control valve means.

6. Apparatus as recited in claim 5 in which said magnetic means are of the electromagnetic type.

7. Apparatus as recited in claim 4 which includes working medium responsive means connected to said control valve means for responding to changes of a parameter indicative of the condition of the working medium and disposed at a selected point in said system for automatically governing said control valve means to counteract such changes.

8. Apparatus as recited in claim 3 and including a magnet core connected to said slide valve element to move in a predetermined path upon movement of said valve element, a tubular member of non-magnetic material surrounding said path, and magnetic means adapted to create a magnetic field adjustable along said tubular member.

9. Apparatus as recited in claim 8 in which said magnetic means includes at least two selectively energizable solenoids surrounding said tubular member and spaced therealong.

10. Apparatus as recited in claim 9 which includes switch means connected to said solenoids for responding to changes of a parameter indicative of the condition of the working medium and disposed at a selected point in the working medium system for automatically energizing a solenoid properly positioned to move said magnet core and said slide valve element in a direction to oppose said changes.

11. A screw rotor machine for an elastic working medium and of the type which comprises a housing containing a working space in the form of two intersecting bores and having a low pressure port at one end and a high pressure port at the other end, two intermeshing screw rotors being rotatably mounted in said bores and part of the wall of said working space consisting of an axially slidable valve member the position of which determines the capacity of the machine, characterized in that the valve member is operably connected to a servo motor of the piston and cylinder type with a stationary cylinder and operated by a pressure fluid already present in the machine for another purpose, control valve means for controlling said servo motor and having a slide valve element cooperating with and axially movable relative to the movable member of the servo motor to control flow of pressure fluid into and out of at least one working chamber of said servo motor in known manner such that each axial position of the slide valve element corresponds to a certain axial position of said movable servo motor member, a pressure fluid supplied tube projecting from an end wall limiting said working chamber and passing axially through said chamber, the servo motor piston being provided with an opening for sliding and sealing engagement with the outside of said tube, said piston having a tubular piston rod forming a cylindrical chamber coaxial with said tube and containing said slide valve element, the barrel wall of said cylindrical chamber being provided with at least one port communicating with said working chamber and said slide valve element being tubular and provided between its ends with two axially spaced lands in sealing engagement with said barrel wall, the space between said lands communicating with the interior of the tubular slide valve element, one of the opposite end portions of said tubular slide valve element being in sliding and sealing engagement with the inner side of said pressure fluid supply tube while the other one of said end portions is correspondingly received in a bore in said piston rod forming an extension of and being coaxial with said chamber, the end portions of said cylindrical chamber communicating with a low pressure space while means are provided for maintaining the higher pressure of the pressure fluid supplied throughout the space formed by said supply tube, the interior of the tubular slide valve member and said piston rod bore, means biasing said piston rod toward said working chamber and means accessible from the outside of said piston for moving said slide valve member axially whereby to cause one of said lands to uncover said port to put it into communication with either one of said low pressure space and said space of higher pressure.

References Cited

UNITED STATES PATENTS

| Re. 16,041 | 4/1925  | Aikman.   |         |
|------------|---------|-----------|---------|
| 1,066,442  | 7/1913  | Vogel     | 310—35  |
| 2,507,945  | 5/1950  | Teague    | 137—85 XR |
| 2,639,721  | 5/1953  | Strief    | 137—85 XR |
| 2,915,045  | 12/1959 | MacKenzie | 137—85 XR |
| 2,936,949  | 5/1960  | Broom     | 230—138 XR |
| 3,045,447  | 7/1962  | Wagenius. |         |
| 3,073,513  | 1/1963  | Bailey    | 230—143 |

FOREIGN PATENTS 950,057   2/1964   Great Britain.

DONLEY J. STOCKING, *Primary Examiner.*

LEONARD H. GERIN, *Assistant Examiner.*

U.S. Cl. X.R.

103—39, 120; 230—9, 143